Figure 1:
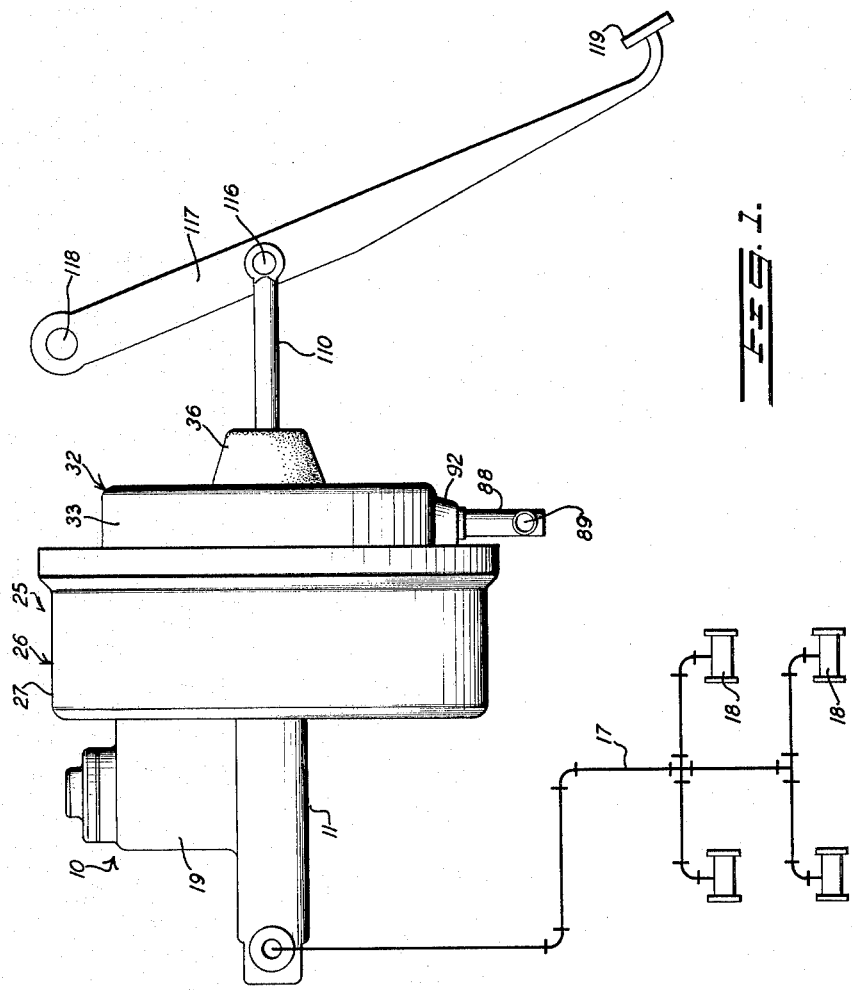

May 12, 1964 J. G. INGRES ETAL 3,132,567
BOOSTER BRAKE MECHANISM
Filed June 24, 1958 2 Sheets-Sheet 1

INVENTORS.
JEANNOT G. INGRES
LAWRENCE E. PULKOWNIK
BY John H. Phillips
ATTORNEY

United States Patent Office 3,132,567
Patented May 12, 1964

3,132,567
BOOSTER BRAKE MECHANISM
Jeannot G. Ingres, Dearborn, and Lawrence E. Pulkownik, Allen Park, Mich., assignors to Kelsey-Hayes Company, Detroit, Mich., a corporation of Delaware
Filed June 24, 1958, Ser. No. 744,110
7 Claims. (Cl. 91—369)

This invention relates to a booster brake mechanism and has particular reference to a novel type of booster motor connected to the fluid displacing plunger of a master cylinder.

Various types of means have been developed in the past for transmitting power to the master cylinder plunger of a brake system from the pressure responsive unit of the motor and from a pedal operable element, together with means for transmitting reaction to the brake pedal to provide the latter with highly desirable "feel." Such expedients in the past comprised, for example, lever means for transmitting power to the master cylinder plunger and to which means forces were applied by the pedal operable means and by the pressure responsive unit of the motor. In other devices for accomplishing the same result, it was proposed to use a tubular piston connected to the motor and a pedal operable rod projecting through such plunger so that part of the fluid displacement from the master cylinder was accomplished by the motor and part by pedal forces, the rod operable by the pedal acting to transmit to the brake pedal reaction forces proportional to pressures built up in the master cylinder.

An important object of the present invention is to provide a novel and highly simplified construction for applying pedal- and motor-generated forces to the master cylinder plunger and for transmitting reaction forces to the brake pedal.

A further object is to provide a mechanism of the character referred to wherein a single simple deformable body is engaged by two force transmitting elements, one of which is connected to the pressure responsive unit of the motor and the other of which is connected to the pedal operable means, and to utilize such deformable body for transmitting both forces to the master cylinder plunger.

A further object is to provide such a mechanism wherein the means for transmitting pedal operable forces to the deformable body acts to transmit direct reaction forces to the brake pedal.

A further object is to provide such an apparatus wherein the ratio of pedal- and motor-applied forces may be determined in accordance with the relative areas of the two members, connected respectively to the pedal operable means and the pressure responsive unit of the motor, engaging the deformable body.

More specifically, a further object is to provide an apparatus of the character referred to wherein a simple annular body of deformable material is employed for transmitting forces to the master cylinder piston, and to employ annular force transmitting members engageable against one face of the deformable body to transmit pedal and motor forces thereto for transmission to the master cylinder plunger and to utilize movements of the annular member connected to the pedal mechanism for operating the follow-up valve mechanism for the motor.

Other objects and advantages of the invention will become apparent during the course of the following description.

Figure 2:
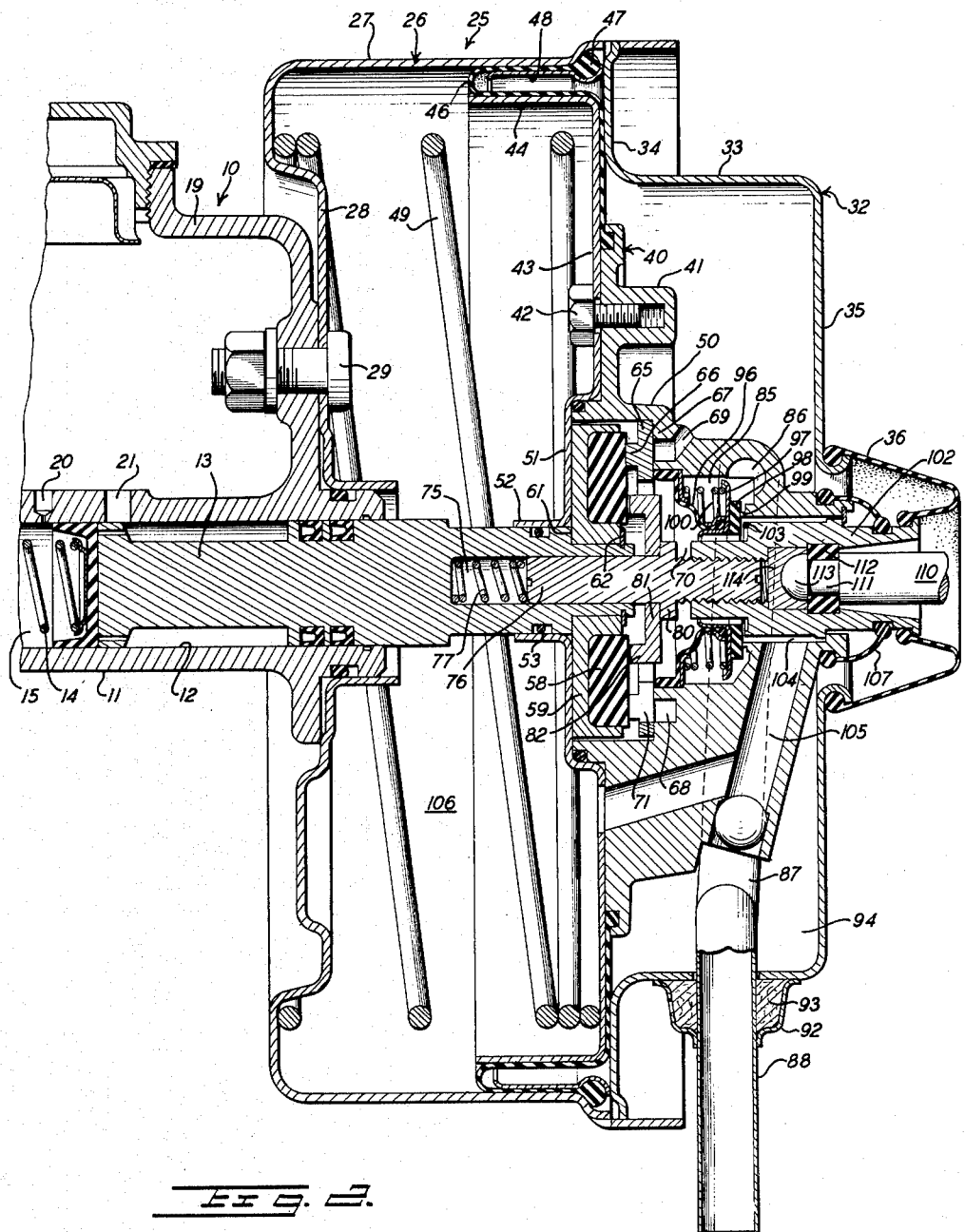

In the drawings I have shown one embodiment of the invention. In this showing:

FIGURE 1 is a side elevation of the booster mechanism, the connection of such mechanism to the wheel cylinders being diagrammatically shown; and FIGURE 2 is an enlarged central fragmentary sectional view through the booster motor unit.

Referring to the drawings and particularly to FIGURE 2, the numeral 10 designates a master cylinder unit as a whole comprising a master cylinder 11 having a bore 12 in which is slidable a generally conventional plunger 13. This plunger is biased to its off position shown in FIGURE 2 by the usual spring 14, the end of which opposite the plunger 13 preferably engages the usual residual pressure valve. The plunger 13 defines forwardly thereof a pressure chamber 15 from which fluid is displaced through lines 17 (FIGURE 1) to conventional wheel cylinders 18. The unit 10 embodies also the usual reservoir 19 communicating with the pressure chamber 15 as at 20, and communicating with the bore 12 rearwardly of the head of the plunger 13 as at 21.

A motor indicated as a whole by the numeral 25 comprises a preferably pressed steel casing section 26 having a cylindrical wall 27 and a forward wall 28 bolted as at 29 to the unit 10. A rear casing section 32 for the motor 32 comprises a cylindrical wall portion 33, of smaller diameter than the cylindrical wall 27, and turning radially outwardly to form a wall 34 perpendicular to the axis of the motor and secured to the casing section 26 in any suitable manner. The casing section 32 further comprises a rear wall 35 perpendicular to the axis of the motor and to which is secured the forward end of a sealing boot 36.

Within the motor 25 is arranged a pressure responsive unit indicated as a whole by the numeral 40. This unit comprises a preferably die-cast body 41 against the forward face of which is secured as at 42 a plate 43 the peripheral portion of which extends concentrically into the cylindrical wall 27 in spaced relation thereto, as at 44. A rolling diaphragm 46 has an outer bead 47 secured to the casing section 26 by a generally cylindrical retaining ring 48. The inner periphery of the diaphragm 46 is secured between the body 41 and plate 43. The portion of the diaphragm overlying the plate 43 engages the wall portion 34 to limit movement of the pressure responsive unit to the off position shown. The pressure responsive unit is biased to such position by a return spring 49.

The body 41 is provided with a generally cylindrical portion 50 forwardly of which the plate 43 extends radially inwardly as at 51 and then forwardly as at 52, an O-ring 53 being arranged between the plate portion 52 and the portion of the plunger 13 which it surrounds.

Within the cylindrical body portion 50 is arranged a highly elastic deformable force transmitting and reaction member 58, such member being annular and shaped as shown in FIGURE 2 and arranged in a channeled retaining ring 59. The radially inner portion of the ring 59 seats against a shoulder 61 formed on the plunger 13. The retainer 59 is held in the position shown by a snap ring 62. The ring 59 normally seats against the plate portion 51, but the latter is movable slightly to the left of the ring 59 under conditions which will become apparent.

It will become apparent that the elastic deformable body 58 is confined radially by the radially inner and outer walls of the channel in the ring 59, and is confined axially of the motor by the bottom wall of such channel. The rear face of the member 58, however, is subject to deformation by forces applied thereto in a manner to be described.

A force transmitting ring 65 is arranged within the cylindrical body portion 50 and is provided with an annular flange 66 engaging the rear face of the elastic body 58. The force transmitting member 65 seats against a shoulder 67 formed in the body 41 as shown. This body, rearwardly of the member 65, is provided with an annular groove 68 communicating with the interior of the housing section 32 as at 69. The groove 68 communicates with a variable pressure space 70 through a radial notch 71 formed in the member 65.

The rear end of the plunger 13 is provided with a bore 75 into which projects the forward end of a stem 76, biased rearwardly by a spring 77 arranged in the bore 75. The stem 76 is provided with an annular shoulder 80 against the forward face of which seats an annular force transmitting member 81, having an annular rearwardly extending flange 82 preferably normally slightly spaced from the rear face of the deformable member 58, radially inwardly of the flange 66. For a reason which will be described, the faces of the flanges 66 and 82, which engage the deformable member 58, may be somewhat curved instead of straight as shown in the drawing.

The rear portion of the body 41 is provided with a chamber 85 communicating through a passage 86 with a pigtail tube 87 connected to a pipe section 88 extending through the cylindrical casing wall 33 and having a nipple 89 connectible to a flexible hose or other type of duct leading to a source of vacuum such as the intake manifold. The pipe 88 is surrounded by a retainer 92 in which is arranged an air cleaner 93, and through this cleaner air is supplied to the chamber 94 formed within the casing section 32. It will be apparent, therefore, that atmospheric pressure is always present in the annular groove 68 and in the space 70.

The space 70 and chamber 85 are sealed from each other by a diaphragm 96. This diaphragm is sealed at one end with respect to the body 41 and at its other end with respect to a cage 97 carrying a resilient valve 98. This valve normally engages a seat 99 as shown in FIGURE 2. The valve 98 is biased rearwardly by a spring 100.

The stem 76 is connected to a head 102, and this head carries a valve seat 103 normally spaced from but engageable with the valve 98 under conditions to be described. Around the head 102 and within the surrounding portion of the body 41 is formed a space 104 communicating through a passage 105 with a chamber 106 formed within the casing section 26. The space 104 is sealed from the interior of the boot 36 as at 107.

An operating rod 110 is provided near its left end with a reduced stem 111 extending through a resilient sleeve 112 snapped into position in the head 102. The stem 111 terminates in a hemispherical head 113 seating in a small plug 114 retained in the head 102 by the resilient sleeve 112. Referring to FIGURE 1, it will be noted that the operating rod 110 is pivotally connected at its rear end as at 116 with a depending pedal lever 117, pivotally supported at its upper end as at 118 and provided at its lower end with a pedal pad 119.

*Operation*

The parts normally occupy the positions shown in FIGURE 2 with the flange 66 engaging the deformable member 58 and with the flange 82 in contact with or very slightly spaced from the deformable member 58. The valve 98 will be in engagement with the seat 99 and disengaged from the seat 103. Under such conditions, atmospheric pressure will be present in the motor chamber 106, and such pressure is always present in the chamber 94. Connection between these two chambers under such conditions is through port 69, groove 68, notch 71, chamber 70, space 104 and passage 105. Thus the motor return spring 49 normally holds the pressure responsive unit 40 in the off position shown.

The motor is rendered operative by depressing the pedal pad 119 (FIGURE 1) to move the push rod 110 axially toward the left. Such operation of the pedal moves the head 102 to the left of the position shown in FIGURE 2 to engage the valve seat 103 with the valve 98. As previously stated, the rear surface of the flange 82 is slightly spaced from the exposed face of the elastic body 58. This spacing is preferably equal to the space between the valve 98 and valve seat 103 when the parts are in the normal positions shown in FIGURE 2. Movement of the push rod 10, therefore, takes place initially solely against the loading of the spring 77, and the flange 82 will come into contact with the ring 58 at the lap position of the valves. The spacing of the flange 82 from the elastic body 58 is not of great importance, however, due to the high degree of deformability of the body 58. Accordingly, the flange 82 normally may be engaged with the rear face of the body 58, in which case there will be little additional resistance to movement of the push rod 110 from normal off position.

Upon further movement of the push rod 110, the seat 103 engages the valve 98 to move it against the light tension of the spring 100, and the valve is thus moved out of engagement with the seat 99. The closing of the valve seat 103 against the valve 98 will have disconnected the annular space 104 from the atmosphere, and movement of the valve from the seat 99 will have connected the space 104 to the passage 86 and thus to the interior of the pigtail 87 and the source of vacuum. Air thus will be exhausted from the motor chamber 106 through passage 105 and space 104, and the pressure responsive unit 40 will start to move toward the left.

The channeled ring 59 seats against the shoulder 61, and the flange 52 is slidable over the O-ring 53, when energization of the motor starts in the manner referred to. The plate wall 51 moves away from the channeled member 59 to a slight extent while the member 59 remains stationary, and movement of the pressure responsive unit effects movement of the ring 65 toward the left to transmit force from the flange 66 to the deformable body 58. Motor force thus will be applied through the body 58 and member 59 to the plunger 13 to effect movement thereof into the master cylinder.

Movement of the valve parts beyond lap position to energize the motor takes place by movement of the flange 82 to the left beyond the normal plane of the exposed face of the member 58, thus distorting the rear face of the member 58. As motor energization takes place for a given initial motor energizing movement of the valve parts, it will be apparent that the pressure responsive unit will move the flange 66 to the left into the body of material 58. Since this material is confined against deformation radially and axially toward the left in FIGURE 2, the exposed face portion of the body 58 will be distorted and pressure exerted by the flange 66 on the body 58 will cause the latter to exert a force rearwardly against the flange 82, tending to return the valve parts to normal positions. It will be apparent that the high degree of elasticity of the body 58 causes it to act as a spring and, in all operative positions of the parts, serves to distribute pressures between the body 58 and the two flanges 66 and 82.

If force is applied to the push rod 110 during brake application and while the motor is being progressively energized, the flanges 66 and 82 of the two force transmitting members will bear with increasing pressure against the deformable member 58. Thus both force transmitting members will apply force to move the plunger 13, and the ratio of the two forces will depend upon the relative ratios of the areas of the flanges 66 and 82 bearing against the deformable member 58. The single elastic member 58, which is of a very simple construction, therefore serves to transmit all operating forces to the plunger 13 and the force reacting back through the flange 82 transmits reaction force to the brake pedal to provide the latter with accurate "feel."

The brakes are released by relieving pressure against the pedal pad 119. The two springs 77 and 100 act immediately to move the head 102 to the lap position of the valve elements, beyond which point the spring 77 returns the head 102 to the normal position shown in FIGURE 2. When the lap position is reached, the source of vacuum is disconnected from the space 104 and consequently from the motor chamber 106. The opening of the valve seat 103 again connects the chamber 106 to the atmosphere. Thus pressures will be balanced in the motor chambers 94 and 106, and the return spring 49 will promptly move the motor parts to the off positions shown. The brake will now be fully released.

The present construction provides highly simplified means for transmitting both manual and motor forces to a master cylinder plunger without the use of levers, separate power operated and manually operated fluid displacing plungers or other expedients for accurately transmitting reaction forces to the brake pedal. Any desired reaction ratios may be provided by using reaction members 65 and 81 having respectively flanges 66 and 82 of the desired areas.

The master cylinder itself functions conventionally, as will be obvious. The transmission of forces to the plunger 13 to move it to the left promptly closes the replenishing port 20, and forces generated in the master cylinder chamber 15 are supplied through lines 17 to the wheel cylinders 18 to apply the brakes. The degree of brake application will always be proportional to the reaction transmitted from the reaction member through the rod 110 to the brake pedal. The free movement provided between the pressure responsive unit and the retaining member 59 permits the pressure responsive unit to move to whatever extent may be necessary to apply deforming and power forces from the pressure responsive unit to the elastic body 58.

As previously stated, the edges of the flanges 66 and 82 which engage the elastic body 58 may be flat as shown, or either or both such faces could be curved or convoluted so that their entire areas when moved into engagement with the elastic body 58 will not immediately be effective for deforming the elastic body. With such arrangement, decreased pedal effort would be required to initially deform the elastic body 58, thus further "softening" the initial pedal effort.

It will be noted that the parts of the motor mechanism including the valving, reaction rings, elastic body 58 and force transmitting member 59 are arranged in a cavity in the cast body 41, which cavity opens through the rear of the body 41. All of the elements referred to, therefore, can be easily assembled within the body of the pressure responsive unit, after which the plate 43 may be secured in position as at 42.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A booster motor mechanism comprising a fluid pressure motor having a pressure responsive unit, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is manually operable, an elastic body formed as an annulus engaging and wholly carried and radially confined by said member to be operated and with respect to which body both said manually operable element and said pressure responsive unit are relatively movable from normal off positions, and annular reaction members engaging respectively with said manually operable element and with said pressure responsive unit and having concentric surfaces of smaller total area than and engaging a surface of said elastic body, said surface of said elastic body having free area portions to provide for the deformation of said elastic body under pressure, whereby, upon operation of said valve mechanism and energization of said motor, said elastic body will be deformed and both of said concentric surfaces will deliver forces to said elastic body and through such body to said member to be operated.

2. A booster motor mechanism comprising a fluid pressure motor having a pressure responsive unit, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is manually operable, an annular force transmitting member seating against said member to be operated to transmit operating forces thereto, said pressure responsive unit and said manually operable element being movable from normal off positions relative to each other and to said force transmitting member, said force transmitting member having an annular groove, an elastic body formed as an annulus in said groove, and annular reaction members engaging respectively with said manually operable element and with said pressure responsive unit and having concentric surfaces of smaller total area than and engaging a surface of said elastic body, said surface of said elastic body having free area portions to provide for the deformation of said elastic body under pressure, whereby, operation of said valve mechanism and energization of said motor, said elastic body will be deformed and both of said concentric surfaces will deliver forces to said elastic body and through said force transmitting member to said member to be operated.

3. A booster motor mechanism comprising a fluid pressure motor having a pressure responsive unit including an axial body, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is coaxial with said member to be operated and is manually operable, said body having an annular space therein, an elastic body formed as an annulus arranged in said annular space having force transmitting connection with said member to be operated and with respect to which body both said manually operable element and said pressure responsive unit are respectively movable from normal off positions, and annular reaction members in said annular space engaging respectively with said manually operable element and with said pressure responsive unit and having concentric surfaces of smaller total area than and engaging a surface of said elastic body, said surface of said elastic body having free area portions to provide for the deformation of said elastic body under pressure, whereby, upon operation of said valve mechanism and energization of said motor, said elastic body will be deformed and both of said concentric surfaces will deliver forces to said elastic body and through such body to said member to be operated, said elastic body being confined radially and in the direction of movement of said member to be operated and having one exposed face engageable with said reaction members.

4. A booster motor mechanism comprising a fluid pressure motor having a pressure responsive unit including an axial body, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is coaxial with said member to be operated and is manually operable, an annular force transmitting member surrounding the axis of said pressure responsive unit, said member to be operated having a shoulder against which a portion of one side of said force transmitting member engages in the direction of movement from a normal position of said member to be operated, the other side of said force transmitting member being provided with an annular groove, an elastic body formed as an annulus fitting in said groove and having an exposed face at said other side of said force transmitting member, annular reaction members carried respectively by said body of said pressure responsive unit and by said manually operable member and having surfaces of smaller total area than and engaging a surface of said elastic body, said surface of said elastic body having free area portions to provide for the deformation of said elastic body under pressure, and means biasing said pressure responsive unit to a normal off position, said pressure responsive unit being movable from such position independently of said force transmitting member and having a wall portion normally engaging said one side thereof.

5. A mechanism according to claim 4 wherein said reaction members and said surfaces thereof are annular and concentric with said elastic body.

6. A booster brake mechanism comprising a fluid pressure motor having a pressure responsive unit including a cast body, said body in one side thereof having an axial cavity opening through said body in the direction of movement of said pressure responsive unit when said motor is energized, a valve mechanism in said cavity normally connecting said motor to one source of pressure and being movable from normal off position to connect said motor to a different source of pressure to move said pressure responsive unit, said valve mechanism comprising a plurality of elements one of which is coaxial with said motor and is manually operable, a member to be operated arranged coaxial with said manually operable element, said pressure responsive unit having a plate portion closing the open end of said cavity, a force transmitting member in said cavity engaging said member to be operated and having an annular groove, an elastic body formed as an annulus substantially filling said groove and having an exposed surface facing away from the direction of movement of said member to be operated from normal off position, and annular reaction members in said cavity engaging respectively with said cast body and with said manually operable member and having annular surfaces of smaller total area than and engaging a surface of said exposed surface of said elastic body, said surface of said elastic body having free area portions to provide for the deformation of said elastic body under pressure, whereby, upon operation of said valve mechanism and energization of said motor, said elastic body will be deformed and said surfaces of said reaction members will transmit forces to said elastic body and through said force transmitting member to said member to be operated.

7. A mechanism according to claim 6 wherein said cavity is provided with a wall portion against which one of said reaction members seats to transmit force from said cast body to said elastic body, said manually operable element having an annular shoulder engaging the other of said reaction members to transmit force from each element to said elastic body.

References Cited in the file of this patent
UNITED STATES PATENTS

| | | |
|---|---|---|
| 1,994,388 | Erichsen | Mar. 12, 1935 |
| 2,275,697 | Stelzer | Mar. 10, 1942 |
| 2,646,665 | Rockwell | July 28, 1953 |
| 2,828,719 | Ayers | Apr. 1, 1958 |